(12) United States Patent
Elbel et al.

(10) Patent No.: US 10,746,898 B2
(45) Date of Patent: Aug. 18, 2020

(54) METHOD AND DEVICE FOR OBJECT RECOGNITION AND ANALYSIS

(71) Applicant: Infineon Technologies AG, Neubiberg (DE)

(72) Inventors: Norbert Elbel, Rosenheim (DE); Thomas Beer, Mauerstetten (DE); Georg Pelz, Ebersberg (DE)

(73) Assignee: Infineon Technologies AG, Neubiberg (DE)

( * ) Notice: Subject to any disclaimer, the term of this patent is extended or adjusted under 35 U.S.C. 154(b) by 23 days.

(21) Appl. No.: 16/052,290

(22) Filed: Aug. 1, 2018

(65) Prior Publication Data

US 2020/0041687 A1 Feb. 6, 2020

(51) Int. Cl.
*G01V 8/20* (2006.01)
*G01P 3/36* (2006.01)
*G01N 15/02* (2006.01)

(52) U.S. Cl.
CPC ........... *G01V 8/20* (2013.01); *G01N 15/0227* (2013.01); *G01P 3/36* (2013.01)

(58) Field of Classification Search
CPC .......... G01V 8/20; G01P 3/36; G01N 15/0227
See application file for complete search history.

(56) References Cited

U.S. PATENT DOCUMENTS

| | | | |
|---|---|---|---|
| 8,242,476 B2 | 8/2012 | Mimeault et al. | |
| 8,767,215 B2 | 7/2014 | Cantin et al. | |
| 9,235,988 B2 | 1/2016 | Mimeault et al. | |
| 2010/0013763 A1* | 1/2010 | Futter | G06F 3/017 345/158 |
| 2011/0205521 A1* | 8/2011 | Mimeault | G01S 7/4814 356/4.01 |
| 2014/0183269 A1* | 7/2014 | Glaser | G06F 21/32 235/492 |
| 2015/0131080 A1* | 5/2015 | Retterath | G01S 17/10 356/5.01 |
| 2016/0296797 A1* | 10/2016 | Rosen | A63B 63/00 |

* cited by examiner

*Primary Examiner* — Hina F Ayub
(74) *Attorney, Agent, or Firm* — Murphy, Bilak & Homiller, PLLC

(57) ABSTRACT

An electronic system includes a pixelated light source having a plurality of individually controllable pixels, a controller operable to control the pixelated light source, a photosensor configured to detect light signals emitted from the pixelated light source, and an analysis unit configured to recognize objects with different properties that pass in range of the pixelated light source and the photosensor, based on the light signals detected by the photosensor. Corresponding object recognition and material analysis methods are also described.

21 Claims, 15 Drawing Sheets

METHOD AND DEVICE FOR OBJECT RECOGNITION AND ANALYSIS

BACKGROUND

Static and moving object recognition is a standard task in many industrial processes such as automation technology, conveyor belts, robots, etc., and consumer applications such as household appliances, electromechanical toys, etc. In its simplest form, object recognition is typically realized by a photosensor (light barrier) which can detect whether an object is present or not, but which cannot easily distinguish between objects having different shapes, moving with different velocities, etc. In a more sophisticated form, object recognition is typically realized by a camera system in combination with digital image processing for pattern recognition. Such systems provide a much wider range of functions including differentiation between different object shapes, velocities, etc., but are also much more complex and expensive.

Material analysis systems that include sensors for detecting the level of impurity in liquids and gases are gaining importance. Low-end material analysis systems are typically realized by a photoelectric sensor which can measure light intensity drop due to light absorbing impurities (e.g. particles) of a liquid or a gas in the space between the light source and sensor element. Smoke detectors are one example. Such devices are capable of detecting the total amount of impurity, but cannot provide information about particle size, particle homogeneity, flow velocity of particles in the gas or the liquid, etc. High-end material analysis systems are typically realized by a laser-based particle sensor which employs a light scattering method and can provide more advanced functionality, but are more complex and expensive.

Here, there is a need for compact, robust, easy-to-use and inexpensive object recognition and material analysis systems with extended functionality which bridges the gap between existing low-end and high-end object solutions.

SUMMARY

According to an embodiment of an electronic system, the system comprises: a pixelated light source comprising a plurality of individually controllable pixels; a controller operable to control the pixelated light source; a photosensor configured to detect light signals emitted from the pixelated light source; and an analysis unit configured to recognize objects with different properties that pass in range of the pixelated light source and the photosensor, based on the light signals detected by the photosensor.

In an embodiment, the analysis unit may be configured to recognize objects with at least one of different sizes, shapes, surface reflectivity, transmissivity, density, homogeneity and velocity, based on the light signals detected by the photosensor.

Separately or in combination, the photosensor may be integrated with the pixelated light source in a same semiconductor die or in a same package.

Separately or in combination, the controller may be operable to configure a first subset of the individually controllable pixels as light sources and configure a second subset of the individually controllable pixels as the photosensor.

Separately or in combination, the pixelated light source and the photosensor may be implemented as two separate semiconductor dies opposing each other and controlled by a single controller, wherein a first one of the two separate semiconductor dies is driven as the photosensor and a second one of the two separate semiconductor dies is driven as the pixelated light source.

Separately or in combination, the photosensor may be realized by a subset of the individually controllable pixels of the pixelated light source.

Separately or in combination, the electronic system may further comprise a mirror aligned with the pixelated light source, wherein the subset of individually controllable pixels used to implement the photosensor may be configured to detect light reflections from the mirror.

Separately or in combination, the controller may be configured to change the subset of individually controllable pixels used to implement the photosensor so that the pixels used for light emission and the pixels used for light detection change over time.

Separately or in combination, each pixel of the pixelated light source may be operated alternately in light emission mode and light detection mode.

Separately or in combination, the photosensor may be a non-pixelated single photosensor spaced apart from and aligned with the pixelated light source.

Separately or in combination, the analysis unit may be configured to modify one or more physical characteristics of an object in range of the pixelated light source and the photosensor, by forcing the controller to change at least one of intensity, wavelength or pattern of the light signals emitted by the pixelated light source in a direction of the object.

Separately or in combination, the photosensor may be spaced apart from and aligned with the pixelated light source, and the analysis unit may be configured to detect at least one of particle size, particle size distribution and velocity of objects that pass between the pixelated light source and the photosensor, based on the light signals detected by the photosensor.

Separately or in combination, the electronic system may further comprise: a first polarization foil arranged in close proximity to the pixelated light source; and a second polarization foil arranged in close proximity to the photosensor, wherein the light signals emitted by the pixelated light source and detected by the photosensor pass through the first and the second polarization foils, and the analysis unit may be configured to generate a two-dimensional image based on the light signals detected by the photosensor.

Separately or in combination, the analysis unit may be configured to identify and track movement of an object that passes in range of the pixelated light source and the photosensor, based on the light signals detected by the photosensor, wherein a first signal at a first one of the individually controllable pixels indicates a position of an object, and wherein a second signal from a second one of the individually controllable pixels changes over time to identify and track movement of the object. The position of an object may refer to a location in space and/or to the orientation of the object at a same location in space.

Separately or in combination, the analysis unit may be configured to detect when the object reaches a predetermined position, based on the light signals detected by the photosensor.

Separately or in combination, the analysis unit may be configured to detect when the object reaches the predetermined position by extrapolating from changes in the light signals detected by the photosensor over time, or by detecting a position of the object and comparing the detected position with a target stop position.

Separately or in combination, the photosensor may be a non-pixelated single photosensor spaced apart from and aligned with the pixelated light source.

Separately or in combination, the controller may be configured to sequentially illuminate different groups of pixels of the pixelated light source during a first mode, the analysis unit may be configured to determine a rough position of the object based on the light signals detected by the photosensor during the first mode, the controller may be configured to sequentially illuminate individual pixels of the pixelated light source in a region of the pixelated light source which illuminates an area in the vicinity of the rough position of the object during a second mode, and the analysis unit may be configured to determine a more precise position of the object based on the light signals detected by the photosensor during the second mode.

Separately or in combination, the photosensor may be realized by a subset of the individually controllable pixels of the pixelated light source, the subset of individually controllable pixels used to implement the photosensor may be configured to detect light reflections from a reflective surface of the object which faces the pixelated light source, and the analysis unit may be configured to identify and track movement of the object based on the light signals detected by the subset of individually controllable pixels used to implement the photosensor.

Separately or in combination, each pixel of the pixelated light source may be operated alternately in light emission mode and light detection mode.

Separately or in combination, the photosensor may be realized by a subset of the individually controllable pixels of the pixelated light source, a mirror may be aligned with the pixelated light source; the subset of individually controllable pixels used to implement the photosensor may be configured to detect light reflections from the mirror, and the analysis unit may be configured to identify and track movement of the object based on the light signals detected by the subset of individually controllable pixels used to implement the photosensor.

Separately or in combination, each pixel of the pixelated light source may be operated alternately in light emission mode and light detection mode.

Separately or in combination, the analysis unit may be configured to determine a starting position of an object based on the light signals detected by the photosensor, and the controller may be configured to illuminate different subsets of pixels of the pixelated light source to track movement of the object after the starting position of the object is determined.

Separately or in combination, the controller may be configured to illuminate an object using different light patterns emitted by the pixelated light source, and the analysis unit may be configured to recognize one or more surface properties of the object based on the light signals detected by the photosensor for the different light patterns emitted by the pixelated light source.

According to an embodiment of a method; the method comprises: emitting light from a pixelated light source which comprises a plurality of individually controllable pixels; detecting light signals emitted from the pixelated light source via a photosensor; and recognizing objects with different properties that pass in range of the pixelated light source and the photosensor, based on the light signals detected by the photosensor.

In an embodiment, the method may further comprise: configuring a first subset of the individually controllable pixels as light sources: and configuring a second subset of the individually controllable pixels as the photosensor.

Separately or in combination; the method may further comprise modifying one or more physical characteristics of an object in range of the pixelated light source and the photosensor, by changing at least one of intensity, wavelength or pattern of the light signals emitted by the pixelated light source in a direction of the object.

Separately or in combination, the method may further comprise identifying and tracking movement of an object that passes in range of the pixelated light source and the photosensor, based on the light signals detected by the photosensor, wherein a first signal at a first one of the individually controllable pixels indicates a position of an object, and wherein a second signal from a second one of the individually controllable pixels changes over time to identify and track movement of the object.

Separately or in combination, the method may further comprise: determining a starting position of an object based on the light signals detected by the photosensor; and illuminating different subsets of pixels of the pixelated light source to track movement of the object after the starting position of the object is determined.

Separately or in combination, the method may further comprise: illuminating an object using different light patterns emitted by the pixelated light source; and recognizing one or more surface properties of the object based on the light signals detected by the photosensor for the different light patterns emitted by the pixelated light source, Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide an array of individually controllable light sources in combination with a photosensor and an intelligent control algorithm for detecting and distinguishing between objects with different properties such as size, shape, surface reflectivity, transmissivity, density, homogeneity, velocity, etc. The system may be used to analyse physical properties of liquids and gases and/or to perform object recognition. Object recognition may be provided without the use of a conventional photo camera, e.g. with a resolution in the megapixel regime, followed by computing intense conventional digital image processing for pattern recognition, and advanced material analysis may be provided without the use of a laser-based particle sensor which employs light scattering. The system may thus be less complex and may reduce the required computing resources and energy consumptions compared to conventional systems.

Figure 1:
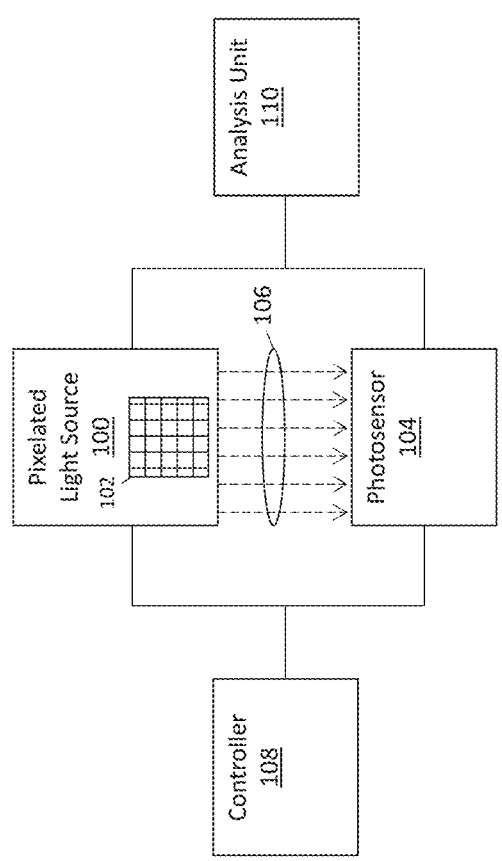
FIG. 1 illustrates a block diagram of an embodiment of an electronic system having a pixelated light source and photosensor, and configured for object recognition and/or material analysis.

FIG. 1 illustrates an embodiment of an electronic system configured for object recognition and/or material analysis. The electronic system includes a pixelated light source 100 comprising a plurality of individually controllable pixels 102, and a photosensor 104 configured to detect light signals 106 emitted from the pixelated light source 100. The wavelength of the emitted light signals 106 may be in the visible spectrum, the IR (infrared) spectrum or the UV (ultraviolet) spectrum, for example.

The term "pixel" as used herein means the smallest controllable element of a light source or photosensor. Each pixel may be capable of emitting light, detecting light or both emitting and detecting light at different points in time. That is, a pixel may be configured just as a light emitter, just as a light detector, or as a light emitter over some durations and as a light detector over other durations. For example, LEDs (light emitting diodes) can be configured to emit light (by impressing a diode current in forward direction) or detect light (by measuring the diode forward voltage or forward current under light expose). The pixel array 102 may have any desired pixel count, e.g. ranging from 4 pixels up to 100,000 pixels or more.

The photosensor 104 may or may not be pixelated. The pixelated light source 100 and the photosensor 104 may be monolithically integrated in the same semiconductor die, integrated in the same package, implemented as discrete components, etc. The pixelated light source 100 and the photosensor 104 may share the same array of pixels 102. For example, first ones of the individually controllable pixels 102 may be used to implement the light source 100, whereas second ones of the individually controllable pixels 102 may be used to implement the photosensor 104. Alternately, the pixelated light source 100 and the photosensor 104 may be implemented with separate pixel arrays if the photosensor 104 is pixelated.

In each case, the electronic system also includes a controller 108 for controlling the pixelated light source 100 and the photosensor 104. The controller 108 may be a processor such as a microprocessor, a processor core, etc., a microcontroller, an ASIC (application-specific integrated-circuit), etc. The controller 108 is designed, programmed and/or hardwired to control the pixelated light source 100 and the photosensor 104 in accordance with the various object recognition and material analysis embodiments described herein. For example, the controller 108 may determine which ones of the individually controllable pixels 102 to illuminate and in what sequence. In the case of the individually controllable pixels 102 being used to implement both the light source 100 and the photosensor 104, the controller 108 determines which ones of the individually controllable pixels 102 are used to implement the light source 100 and which ones of the individually controllable pixels 102 are used to implement the photosensor 104. The controller 108 may change the use of an individually controllable pixel 102 from light emitting to light detecting, or from light detecting to light emitting. The controller 108 may determine which pixels 102 are active and which ones are not. Various control aspects implemented by the controller 106 are explained in more detail below, in accordance with the corresponding embodiment being described.

The electronic system further includes an analysis unit 110 for recognizing objects with different properties that pass in range of the pixelated light source 100 and the photosensor 104, based on the light signals 106 detected by the photosensor 106. For example, the analysis unit 110 may recognize objects with at least one of different sizes, shapes, surface reflectivity, transmissivity, density, homogeneity and velocity.

The analysis unit 110 may be included and/or associated with the controller 108. For example, in the case of a processor-based controller, the controller 108 may be programmed to implement the analysis unit 110 functions described herein. In the case of an ASIC-based controller, the controller 108 may be designed and/or hardwired to implement the analysis unit functions described herein. The analysis unit 110 instead may be a separate component from the controller 108. In each case, the analysis unit 110 implements the object recognition and material analysis functions described herein.

Figure 2:
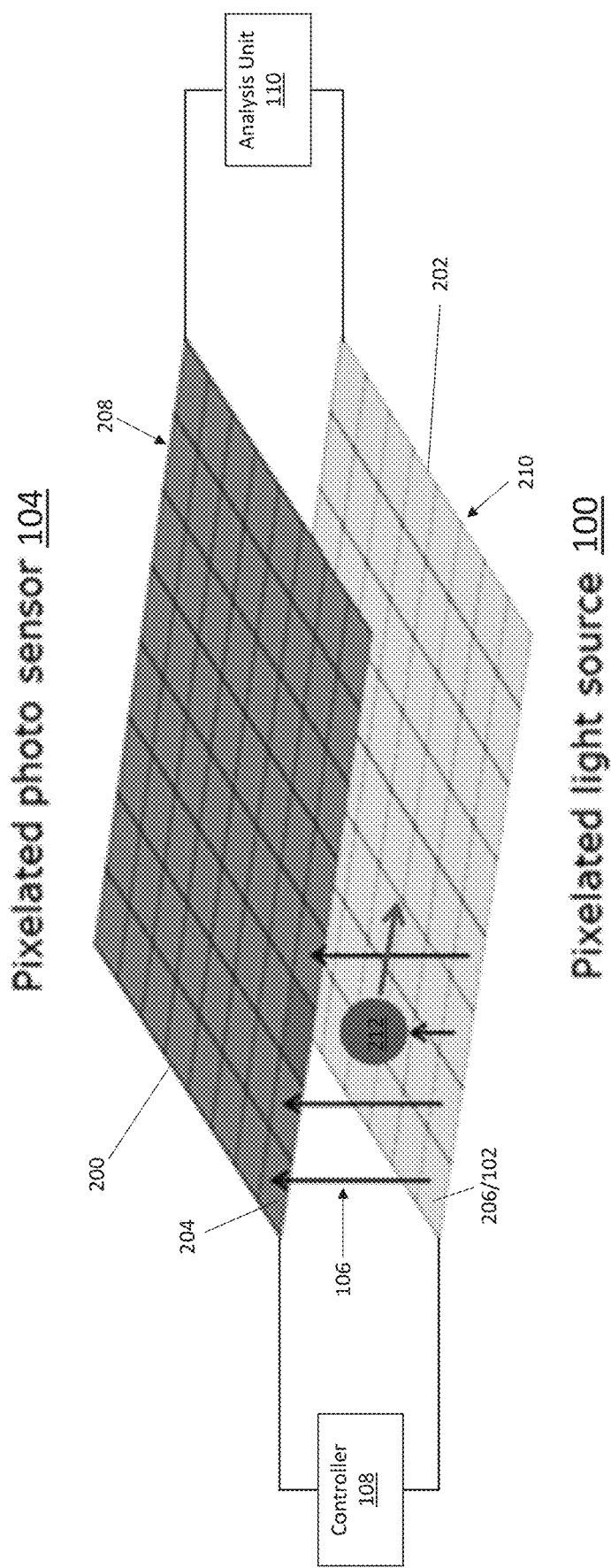
FIGS. 2 through 12 illustrate various embodiments of the pixelated light source and photosensor components of the electronic system.

FIG. 2 illustrates an embodiment of the electronic system in which the pixelated light source 100 and the photosensor 104 are implemented as two separate semiconductor dies 200, 202 spaced apart from and aligned with each other, and controlled by a single controller 108. A first one 200 of the two separate semiconductor dies 200, 202 is driven as the photosensor 104, and a second one 202 of the two separate semiconductor dies 200, 202 is driven as the pixelated light source 100. Both semiconductor dies 200, 202 are pixelated in that the photosensor die 200 and the light source semiconductor die 202 each comprise a plurality of individually controllable pixels 204, 206. According to this embodiment, an array 208 of photosensitive elements 204 and a separate array 210 of light source elements 206 are placed adjacent to each other, With such an arrangement, the analysis unit 110 may detect, within the resolution limit of the individual light source/photosensitive elements 204/206, the size of an object 212 passing between the pixelated light source 100 and the pixelated photosensor 104. Separately or in combination, the analysis unit 110 may detect particle size distribution by comparing the signals of the individual photosensitive elements 204 at the same point in time. Separately or in combination, the analysis unit 110 may detect velocity of the object 212 by comparing the signals of the photosensitive elements 204 at subsequent points in time.

Figure 3:
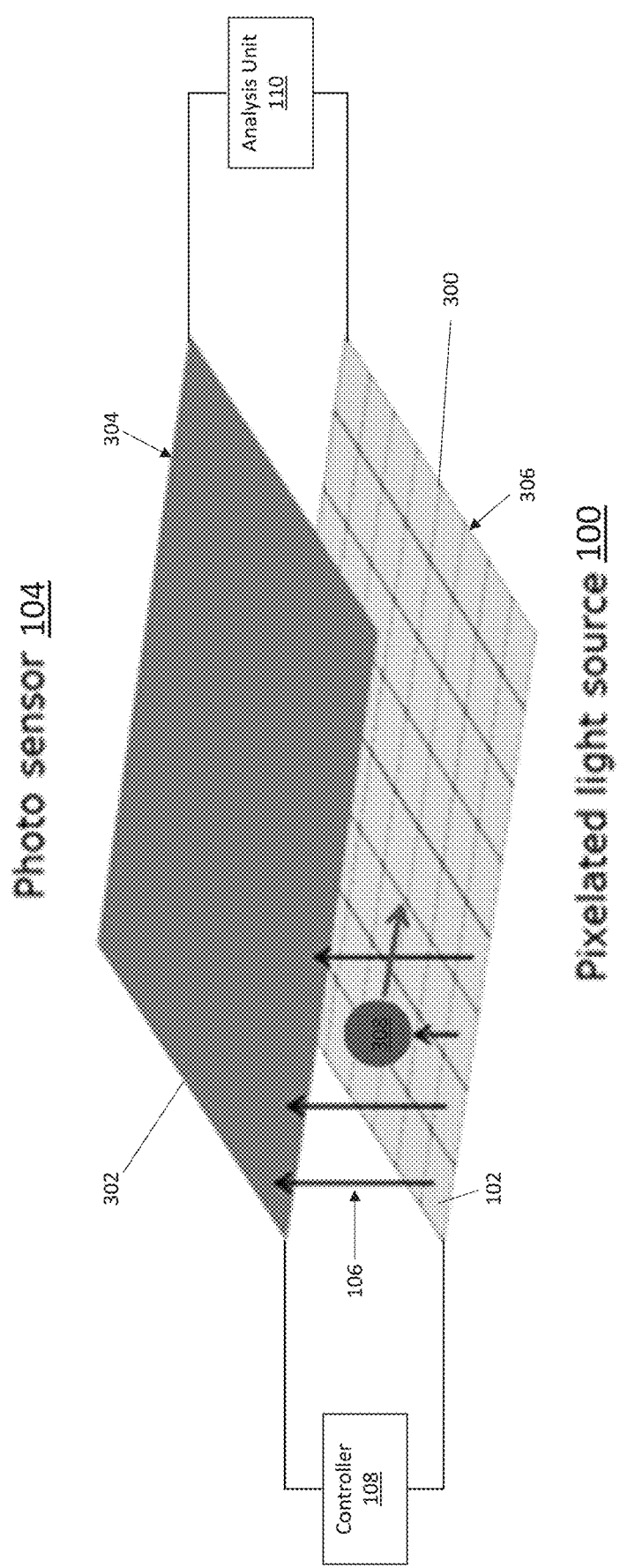

FIG. 3 illustrates an embodiment of the electronic system in which the pixelated light source 100 and the photosensor 104 are implemented as two separate semiconductor dies 300, 302 spaced apart from and aligned with each other, and controlled by a single controller 108. Different than the embodiment shown in FIG. 2, the photosensor die 302 is a non-pixelated single photosensor. In this case, a spatial resolution may be implemented by time-multiplexing a pixelated light source. A non-pixelated single photosensor 304 together with a time-multiplexed pixelated light source 306 may provide sufficient spatial resolution for some applications and thus may provide a cost-efficient solution for those applications. The analysis unit 110 may detect additional information about an object 308 passing between the time-multiplexed pixelated light source 306 and the non-pixelated single photosensor 304, by comparing the photosensor response for different light patterns produced by the light sources 102.

Figure 4:
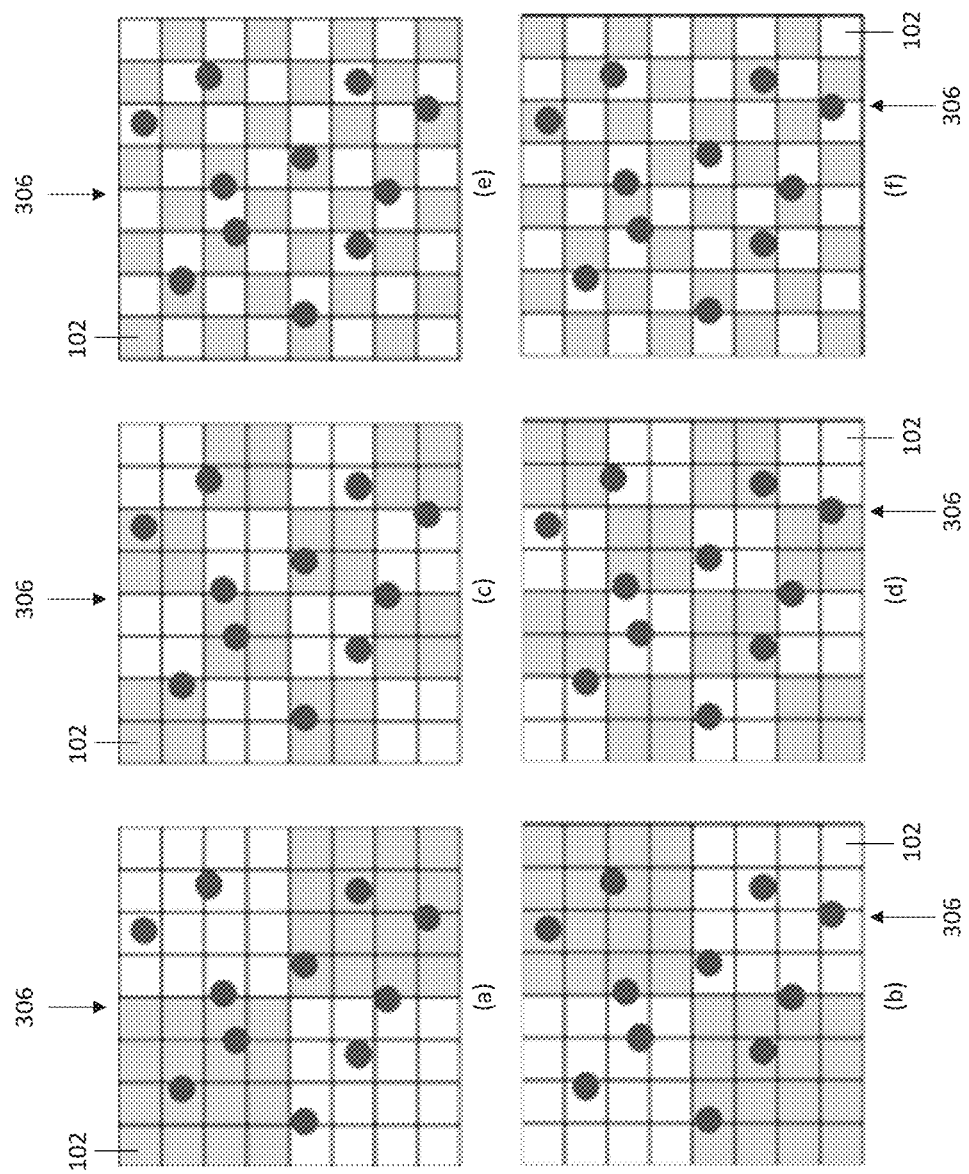

FIG. 4 illustrates a schematic representation of a sequence of checkerboard patterns with increasing resolution down to a single pixel resolution. The sequence of checkerboard patterns is realized by the controller 108 applying appropriate electrical signals to the array 306 of light sources 102. Light pattern (a) utilizes the upper-left and lower-right quadrants of the array 306 of light sources 102, e.g. illustratively shown are quadrants of 16 pixels. Light pattern (b)

utilizes the lower-left and upper-right quadrants of the array 306 of light sources 102. Light pattern (c) has a checkerboard pattern with each illuminated block having a resolution of one fourth the pixel count of one quadrant of light pattern (a) or light pattern (b), e.g. illustratively shown are 4 pixels 102. Light pattern (d) has the opposite checkerboard pattern as light pattern (c) with the same resolution of one fourth of the pixel count of one quadrant of light pattern (a) or light pattern (b) 102. By further changing light patterns in the same way, the spatial resolution of the arrangement depicted in FIG. 4 can be gradually increased up to a single-pixel resolution. Light pattern (e) has the same checkerboard pattern as light pattern (c), but again with one fourth of the pixel count of one quadrant of light pattern (c) or light pattern (d), illustratively shown as a single pixel 102. Light pattern (f) has the opposite checkerboard pattern as light pattern (e) with one fourth of the pixel count of one quadrant of light pattern (c) or light pattern (d), e.g. illustratively shown as a single pixel 102. The analysis unit 110 may derive particle density and/or homogeneity information by comparing the photosensor response for these light patterns produced by the array 306 of light sources 102. Still other light patterns are contemplated. Alternatively, the arrangement may have a common light source and an array of photosensitive elements.

Figure 5:
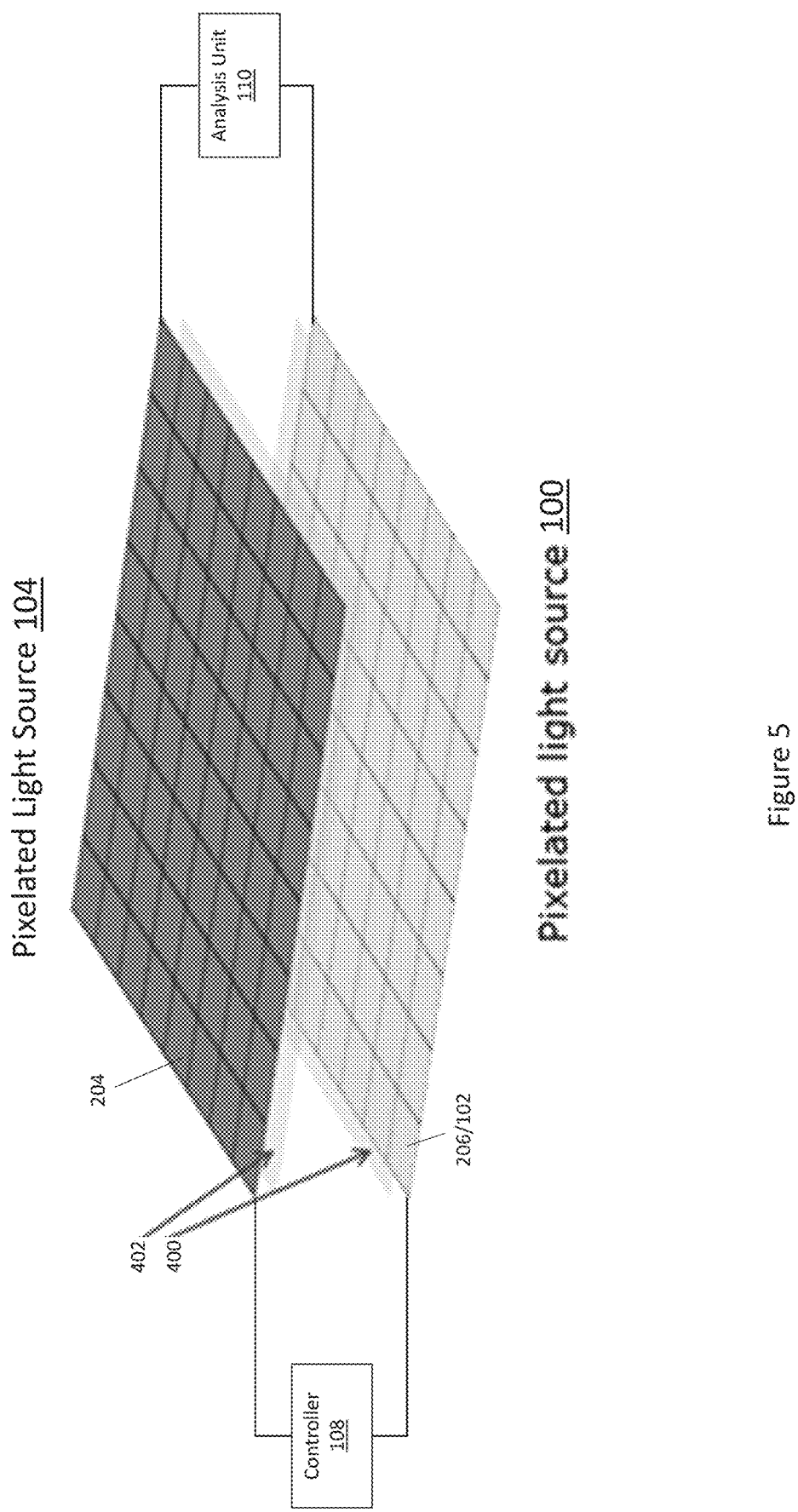

FIG. 5 illustrates an embodiment of the electronic system in which a first polarization foil 400 is arranged in close proximity to the pixelated light source 100 and a second polarization foil 402 is arranged in close proximity to the photosensor 104. The photosensor 104 may be pixelated as shown in FIG. 5, or non-pixelated, e.g., as shown in FIG. 3. Light signals emitted by the pixelated light source 100 and detected by the photosensor 104 pass through the first and second polarization foils 400, 402. With two polarization foils 400, 402 arranged close to the light source 100 and close to the photosensor 104, respectively, the analysis unit 110 may detect one or more additional physical properties of the object (gas, liquid, solid) in the gap between the light source 100 and the photosensor 104. The resolution of the information generated by the analysis unit 110 is limited by the pixel size of the light source 100.

The following are some examples of physical effects which effect/change the plane of polarization of light: transillumination of optically active substances (e.g. polymers or dissolved organic molecules, like sugar molecules dissolved in water); reflection by dielectric surfaces (e.g. the surface of particles in liquids or gases); double-refraction in substances under the impact of local mechanical tension; refraction at the interface between different materials; rotation of the polarization plane in gases (e.g. air), liquids (e.g. water) or solids (e.g. leaded glass) under the influence of a strong magnetic field (Faraday effect); etc. Such physical effects in combination with the polarization foil arrangement shown in FIG. 5 may be used by the analysis unit 110 to investigate and monitor chemical and/or physical properties of gases, liquids or solids. For example, the analysis unit 110 may monitor the concentration and/or local distribution of particles and molecules, viscosity of liquids, local tension in plastics like acrylic (PMMA), etc. The analysis unit 110 may also generate a two-dimensional image based on the light signals detected by the photosensor 104, to report the detected information.

Figure 6:
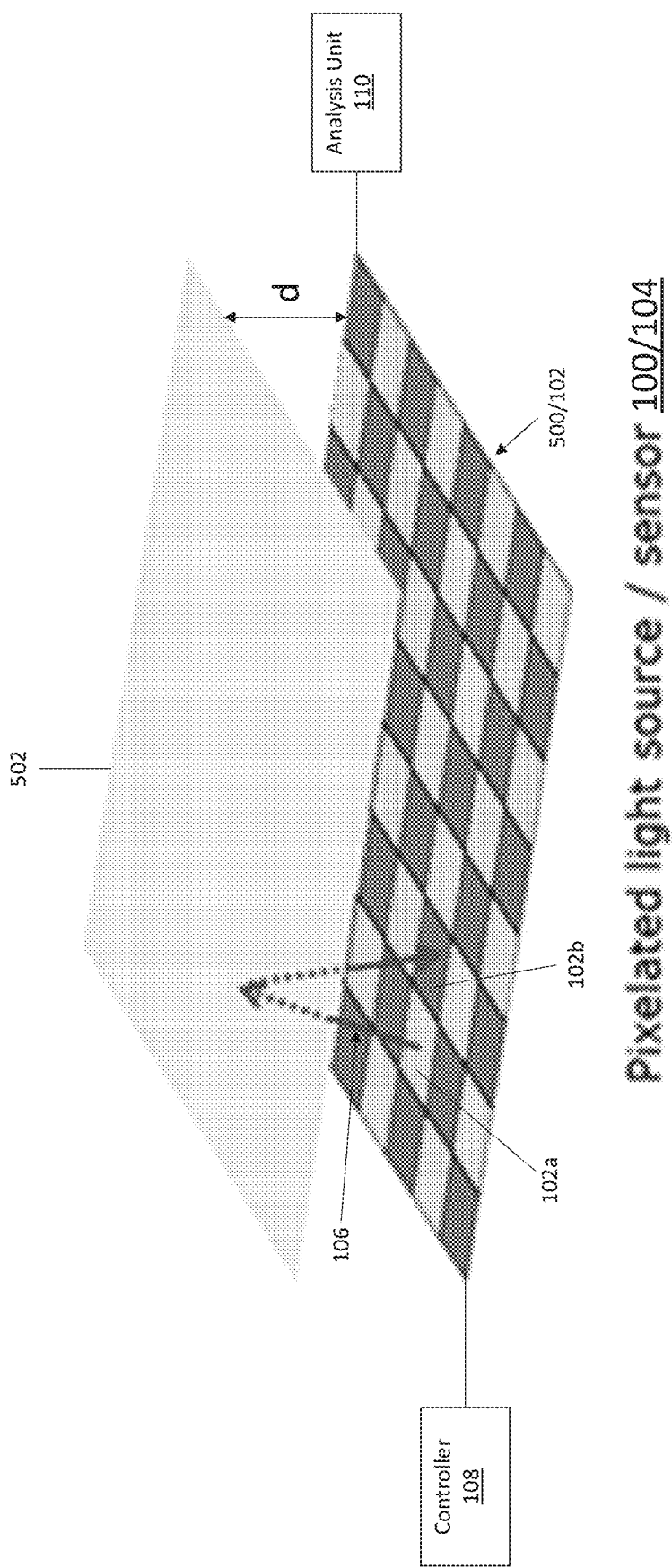

FIG. 6 illustrates an embodiment of the electronic system in which the photosensor 104 is realized by a subset of the individually controllable pixels 102 of the pixelated light source 100. According to this embodiment, the pixelated light source 100 and the photosensor 104 share the same pixels 102 of the pixel array 500. For example, a pixelated Si/LED (light emitting diode) hybrid die with an array 500 of pixels 102 could be used. The pixelated light source 100 and the photosensor 104 may or may not be monolithically integrated in the same semiconductor die.

A mirror 502 is aligned with the combined pixelated light source/photosensor 100/104. The subset 102a of individually controllable pixels 102 used to implement the light source 100 emit light signals 106 in a direction towards the mirror 502. The subset 102b of individually controllable pixels 102 used to implement the photosensor 104 are configured to detect light reflections from the mirror 502. The controller 108 determines which pixels 102 of the array 500 are configured for light emission and which pixels 102 are configured for light detection, by appropriate control of the electrical signals provided to the pixel array 500. The controller 108 may change the subset of individually controllable pixels 102b used to implement the photosensor 104 so that the pixels 102 used for light emission and the pixels 102 used for light detection change over time. In one embodiment, the controller 108 operates each pixel 102 alternately in light emission mode and light detection mode.

In case there is no light-reflecting or light-absorbing material present in the gap between the combined light emitter/photosensor device 100/104 and the mirror 502, the light generated by the pixels 102a configured as light emitters is reflected by the mirror 502 and detected by the pixels 102b configured as photosensors. The spatial resolution of such an arrangement is limited by pixel size, the spatial light distribution characteristics of the pixels 102a configured as light emitters, and the distance d between the combined light source/photosensor device 100/104 and the mirror 502. The spatial resolution may be improved by operating each pixel 102 alternately in light emission mode and in light detection mode, increasing pixel count with physically smaller pixels 102, etc.

The light emitter/photosensor arrangement shown in FIG. 6 may be used by the controller 108 and the analysis unit 110 to implement object recognition. In one embodiment, the subset of individually controllable pixels 102b used to implement the photosensor 104 are configured to detect light reflections from a reflective surface of an object which faces the combined light emitter/photosensor device 100/104. The analysis unit 110 identifies and tracks movement of the object based on the light signals 106 detected by the subset of individually controllable pixels 102b used to implement the photosensor 104. This embodiment is also well-suited for detection and tracking of objects with a non-reflecting (light absorbing) surface.

Figure 7:
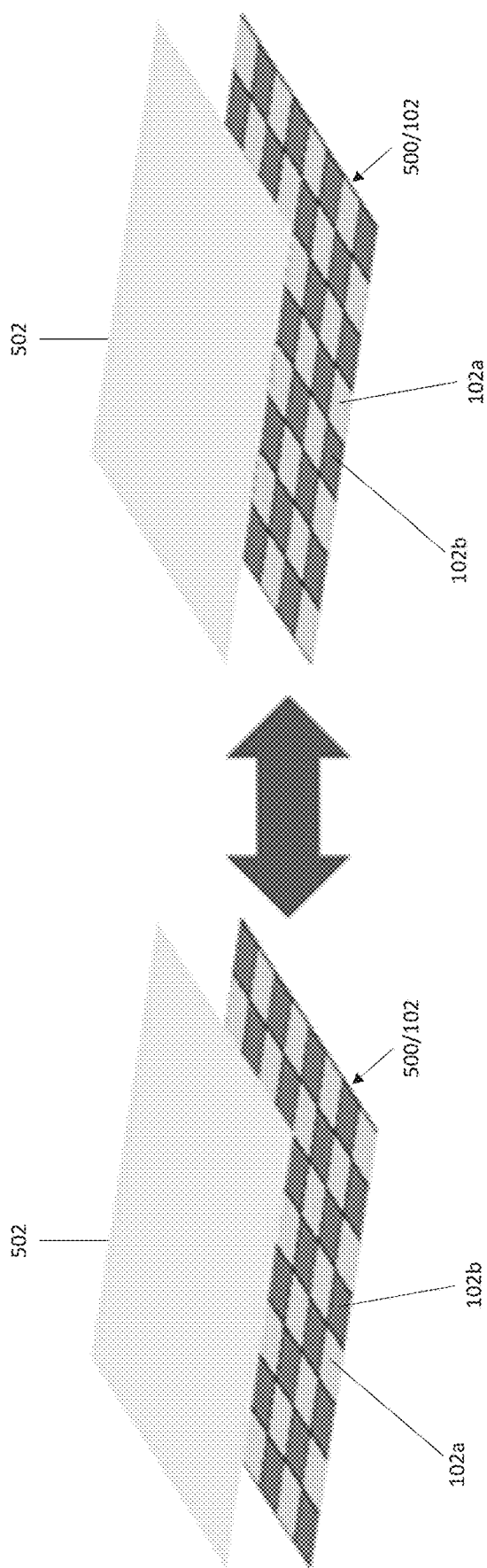

FIG. 7 illustrates an embodiment in which the spatial resolution of the arrangement shown in FIG. 6 can be improved by the controller 108 operating each pixel 102 alternately in light emission and light detection mode. The horizontal line with the double arrow in FIG. 7 indicates that the controller 108 may alternate each pixel 102 in light emission mode and in light detection mode. Various light patterns are contemplated, e.g. as previously described herein and illustrated in FIG. 4. The light pattern shown in FIG. 7 is intended as one example and should not be construed as limiting.

Figure 8:
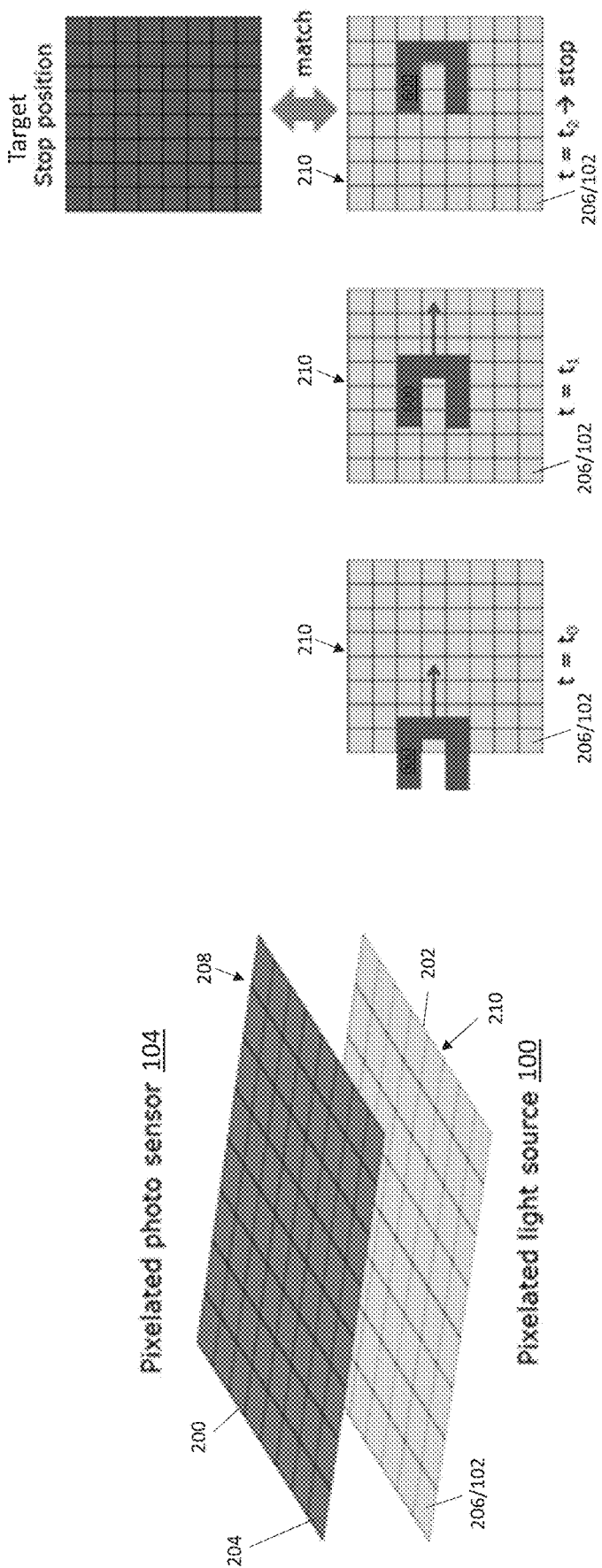

FIG. 8 illustrates an embodiment in which the light emitter/photosensor arrangement shown in FIG. 2 is used by the controller 108 and the analysis unit 110 to implement object recognition. According to this embodiment, the photosensor 104 is pixelated and the analysis unit 110 identifies and tracks movement of an object 600 that passes in range of the pixelated light source 100 and the pixelated photosensor 104, based on the light signals 106 detected by the pixelated photosensor 104. At an initial time t=t₀ to some of the pixels 204, 206 at the left side of the pixel arrays 208, 210 shown in FIG. 8 are shaded by an object 600 and thus provide a low intensity signal indicative of an initial position of the object 600. At time t=t₁ the object 600 has moved towards the right, thus shading another set of pixels 204, 206 providing a low intensity signal. The analysis unit 110 may reconstruct a movement from consecutive signals provided by at least a subgroup of the pixels 204, 206 of the pixel array 208, 210, e.g. those detecting a change in intensity. The analysis unit 110 may be configured to detect when the object 600 reaches a predetermined position (e.g. a 'stop position', where a moving part of a machine needs to stop), based on the light signals 106 detected by the pixelated photosensor 104. In one embodiment, the analysis unit 110 detects when the object 600 reaches the predetermined position by extrapolating from changes in the light signals 106 detected by the pixelated photosensor 104 over time. In another embodiment, the analysis unit 110 detects when the object 600 reaches the predetermined position by detecting a position of the object 600 and comparing the detected position with a target stop position at t=t₂. The target stop position may either be determined as a fixed point in space or a relative position to a predetermined start position.

The analysis unit 110 may implement the embodiment illustrated in FIG. 8 in a time-resolving mode to identify and track objects and to recognize when a certain object has reached a pre-defined position, e.g., a stop position of a machine part. The analysis unit 110 may identify the object 600 by its shape as detected by the pixelated photosensor 104. Separately or in combination, the analysis unit 110 may calculate the velocity of the object 600 from photosensor signal changes over time. Separately or in combination, the analysis unit 110 may extrapolate the stop position from photosensor signal changes over time or may identify the stop position by comparing the actual object position with the targeted stop position.

Figure 9:
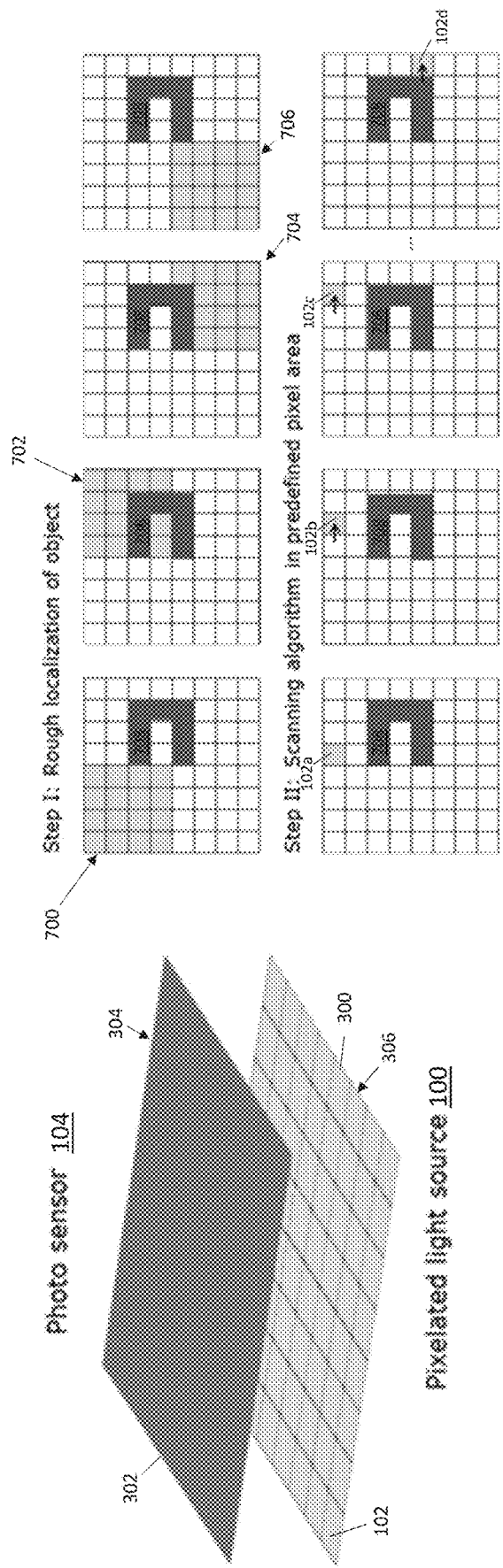

FIG. 9 illustrates an embodiment in which the light emitter/photosensor arrangement shown in FIG. 3 is used by the controller 108 and the analysis unit 110 to implement object recognition. According to this embodiment, the photosensor 104 is non-pixelated and the controller 108 sequentially illuminates different groups 700-706 of pixels 102 of the pixelated light source 100 during a first mode. The analysis unit 110 determines a rough position ('Step I') of an object 708 based on the light signals detected by the photosensor 104 during the first mode. The controller 110 sequentially illuminates individual pixels 102a-102d of the pixelated light source 100 in a region of the pixelated light source 100 which illuminates an area in the vicinity of the rough position of the object 708 during a second mode (Step III The analysis unit 110 determines a more precise position of the object 708 based on the light signals detected by the photosensor 104 during the second mode.

The algorithm implemented by the analysis unit 110 may be used to localize and track an object of interest. The algorithm could, for example, in a first step roughly localize the object by sequentially illuminating different quadrants of the light source array 306 and, in a second step, scan the region in which the object is located, with a higher resolution e.g. by illuminating one pixel 102 at a time. Alternatively, the arrangement may instead have a common light source and an array of photosensitive elements.

Figure 10:
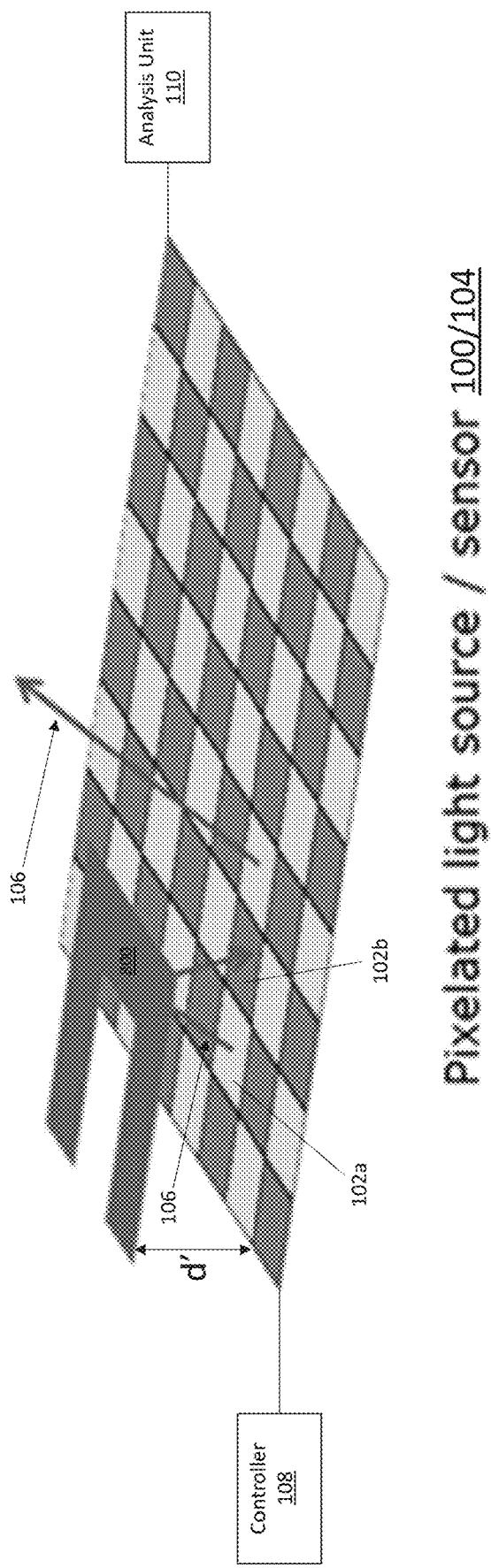

FIG. 10 illustrates an embodiment of the electronic system in which the photosensor 104 is realized by a subset 102b of the individually controllable pixels 102 of the pixelated light source 100, e.g., as previously described herein in connection with FIG. 6, but without the light-reflecting mirror. According to this embodiment, the subset 102b of individually controllable pixels 102 used to implement the photosensor 104 are configured to detect light reflections from a reflective surface of an object 800 which faces the combined pixelated light source/photosensor 100/104. The analysis unit 110 identifies and tracks movement of the object 800 based on the light signals 106 detected by the subset 102b of individually controllable pixels 102 used to implement the photosensor 104. The embodiment shown in FIG. 10 is suitable for detection and tracking of objects with a light-reflecting surface such as a smooth metal surface. Spatial resolution is limited by pixel size, the spatial light distribution characteristics of the pixels 102a configured as light emitters, and the distance d' between the combined light source/photosensor device 100/104 and the reflective object 800 to be detected. The spatial resolution can be improved by operating each pixel 102 alternately in light emission mode and light detection mode, increasing pixel count with physically smaller pixels, etc., as previously described herein.

In addition to detecting the object 800 by its physical shape, the analysis unit 110 may also characterize the object 800 by analysing, recognizing and/or classifying the object 800 based on one or more surface properties such as optical reflectivity, topography, micro-roughness, etc. In one embodiment, the controller 108 illuminates the object 800 using different light patterns emitted by the pixelated light source 100, The analysis unit 110 recognizes one or more surface properties of the object 800 based on the light signals 106 detected by the photosensor 104 for the different light patterns emitted by the pixelated light source 100. Such analysis may be performed by illuminating the object 800 with spatial light distributions generated by the pixelated light source 100 and by the photosensor 104 sensing the light distribution reflected back by the object 800. The analysis unit 110 may compare the result with different references, e.g. stored in a look-up table in the controller 108, to further characterize the object 800 based on one or more physical surface properties.

The analysis unit 110 may modify one or more physical characteristics of the object 800 by forcing the controller 108 to change at least one of intensity, wavelength or pattern of the light signals 106 emitted by the pixelated light source 100 in a direction of the object 800. Based on the characterization result, the analysis unit 110 may generate a spatial light distribution to locally modify the object 800 in a pre-defined way. Modification may be achieved via thermal and/or photo-chemical impact of the light 106 absorbed by the object 800. The characterization and modification processes may be different with respect to light dose (intensity× exposure time) and/or wavelength (e.g. visible light vs UV). For example, the characterization process may involve measuring local thickness variations of a photo-sensitive resist and the modification process may involve uniform UV hardening of the resist by applying an optimum, locally adjusted UV dose. In another example, the characterization process may involve detection of defects such as small cavities in a thin, thermosensitive film and the modification process may involve curing the defects by locally heating the film via emitted and absorbed light.

Figure 11:
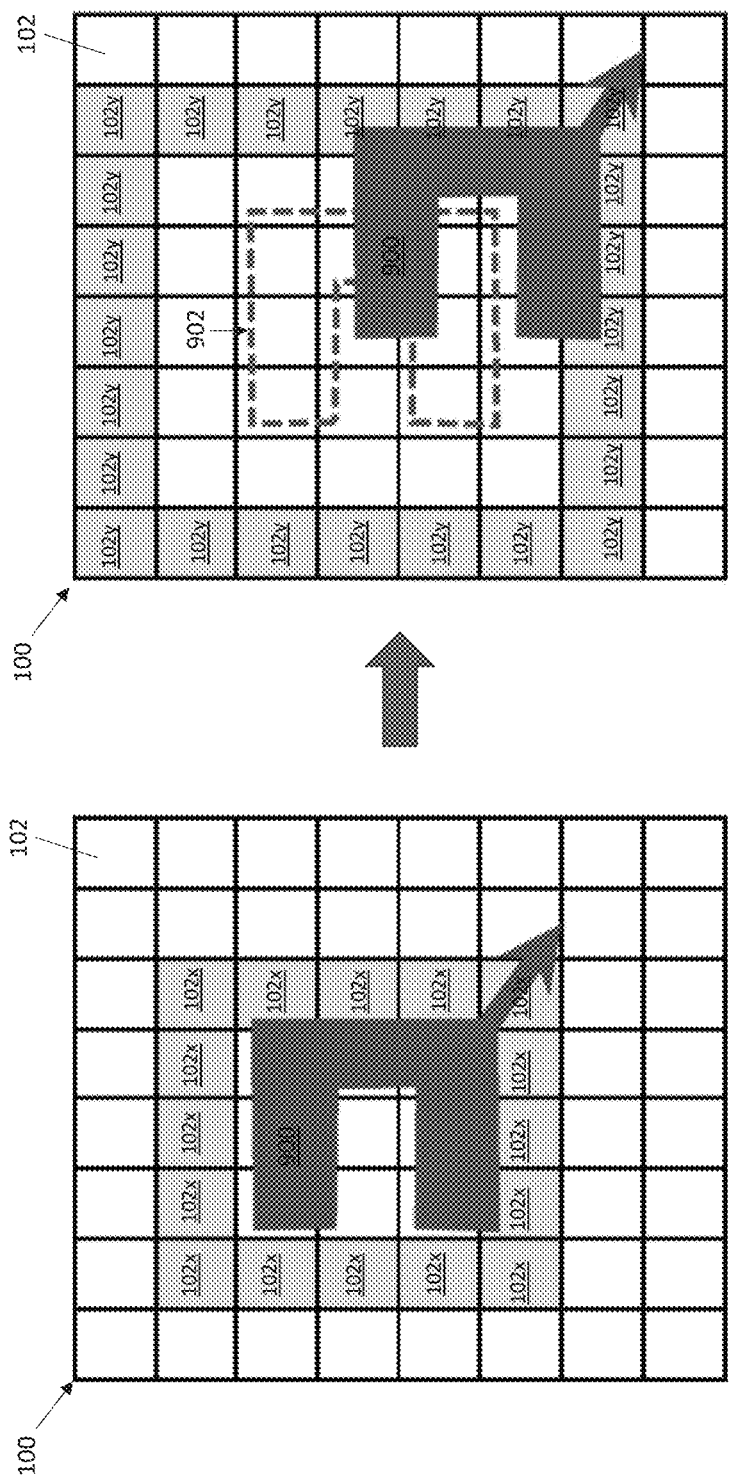

FIG. 11 illustrates another embodiment object detection and tracking implemented by the electronic system. According to this embodiment, the analysis unit 110 determines a starting position of an object 900 based on light signals emitted from subsets 102x of the pixels 102 of the pixelated light source 100 and detected by the photosensor 104 as shown in the left-hand side of FIG. 11. The controller 108 illuminates different subsets 102y of pixels 102 of the pixelated light source 100 as shown in the right-hand side of FIG. 11, so that the analysis unit 110 may track movement of the object 900 based on the photosensor output after the starting position of the object 900 is determined. For example, once the position 902 of an object 900 is known, a ring of pixels 102x around the object 900 may be used to detect position changes. Increasing resolution and using time-multiplexed operation of the pixels 102 allows for more frequent generation of tracking information results, as the number of pixels 102 involved is smaller compared to a full scan using all pixels 102.

Figure 12:
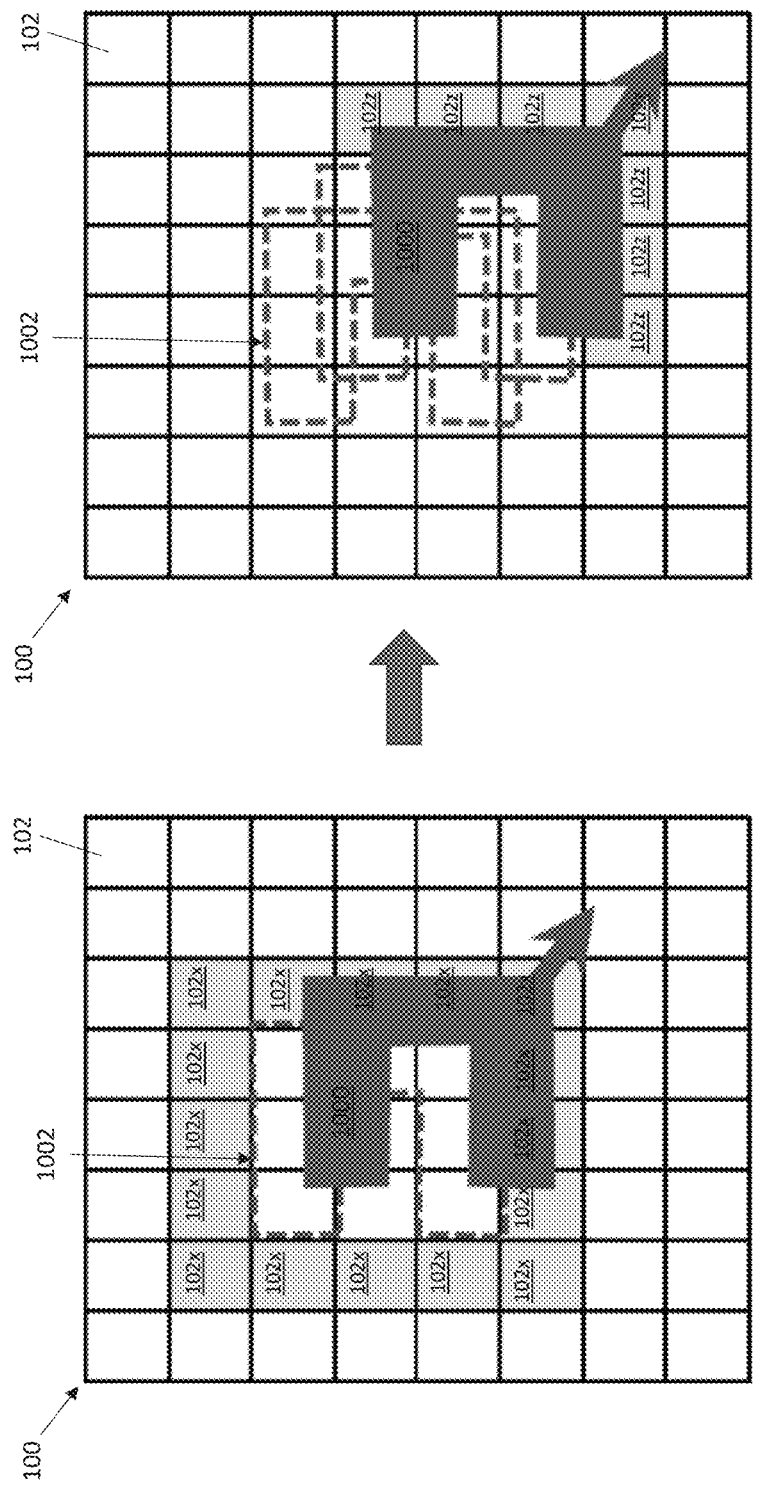

FIG. 12 illustrates another embodiment object detection and tracking implemented by the electronic system. Similar to the embodiment shown in FIG. 11, the analysis unit 110 determines a starting position 1002 of an object 1000 based on the light signals detected by the photosensor 104 as shown in the left-hand side of FIG. 12. Different, however, the controller 110 accounts for the detected direction to further reduce the number of involved pixels 102z, as shown on the right-hand side of FIG. 12. In other words, fewer pixels 102 of the pixelated light source 100 may be used to track the position of the object 1000, which reduces power consumption and which may be used to increase time resolution of object tracking.

Described next are various embodiments for implementing the pixelated light source and 100 the photosensor 104.

Figure 13:
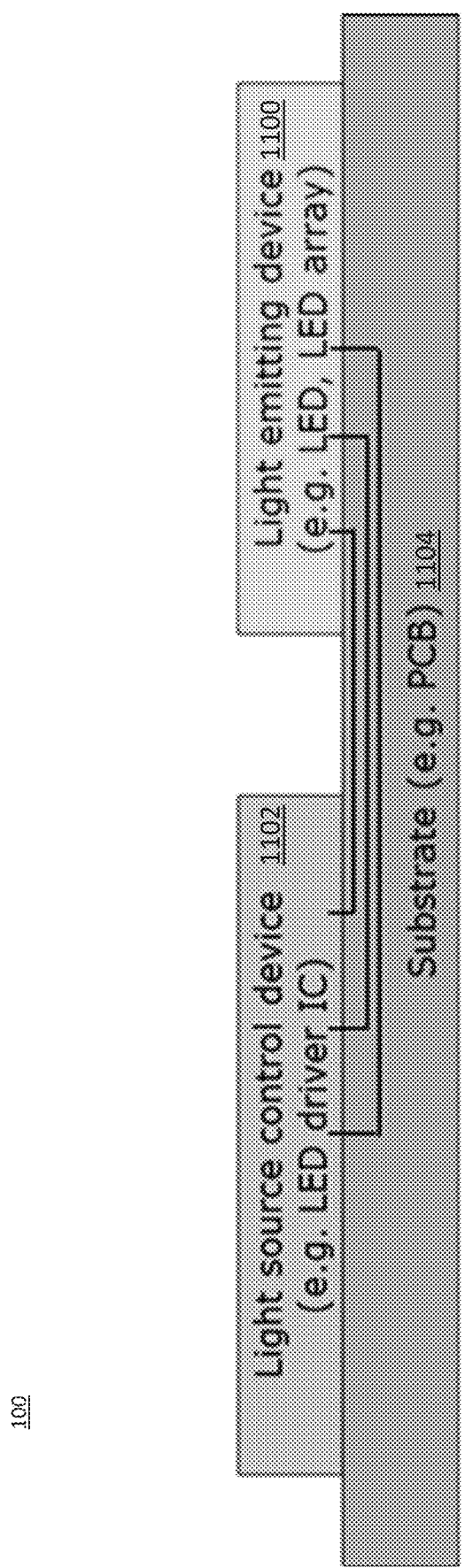
FIGS. 13 through 15 illustrate various implementation embodiments for the pixelated light source and photosensor components of the electronic system.

FIG. 13 illustrates an embodiment of the pixelated light source 100. The pixelated light source 100 may be implemented as a light emitting device 1100 such as an array of discrete LEDs or LEDs arranged in a chip-scalable-package (CSP), and a corresponding LED driver chip (die) or a plurality of LED driver chips 1102 for applying electrical signals to the light emitting device 1100. The emitted light may be visible light, IR radiation, UV radiation, etc. The light emitting device 1100 and the LED driver chip(s) 1102 may be arranged in a side-by-side configuration on a substrate 1104 such as a PCB (printed circuit board). Electrical chip-to-chip connections may be realized via the substrate 1104.

Figure 14:
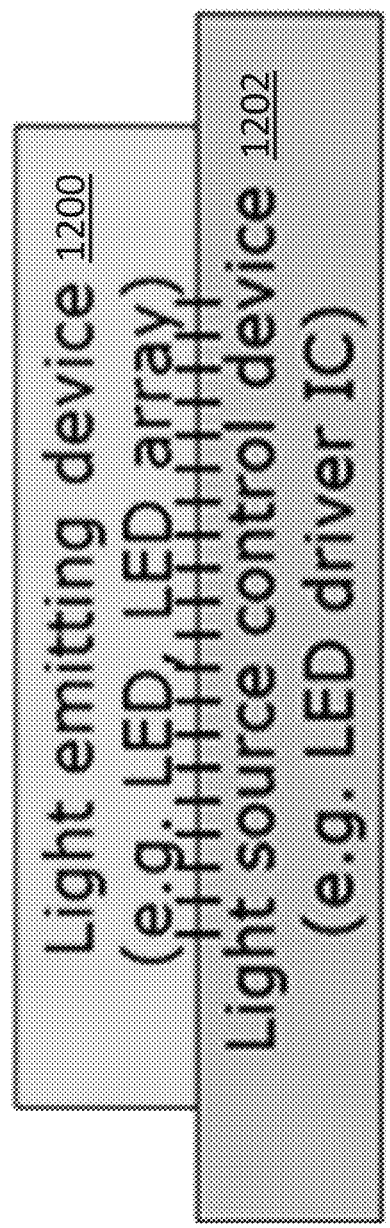

FIG. 14 illustrates another embodiment of the pixelated light source 100. The pixelated light source 100 may be implemented as a light emitting device 1200 such as an array of discrete LEDs or a pixelated monolithic LED chip, and a corresponding LED driver chip or a plurality of LED driver chips 1202 for applying electrical signals to the light emitting device 1200, The emitted light may be visible light, IR radiation, UV radiation, etc. The light emitting device 1200 and the LED driver chip(s) 1202 may be arranged in a hybrid chip-on-chip configuration. Electrical connections may be realized by a vertical chip-to-chip interface between the light emitting device 1200 and the LED driver chip(s) 1202.

Figure 15:
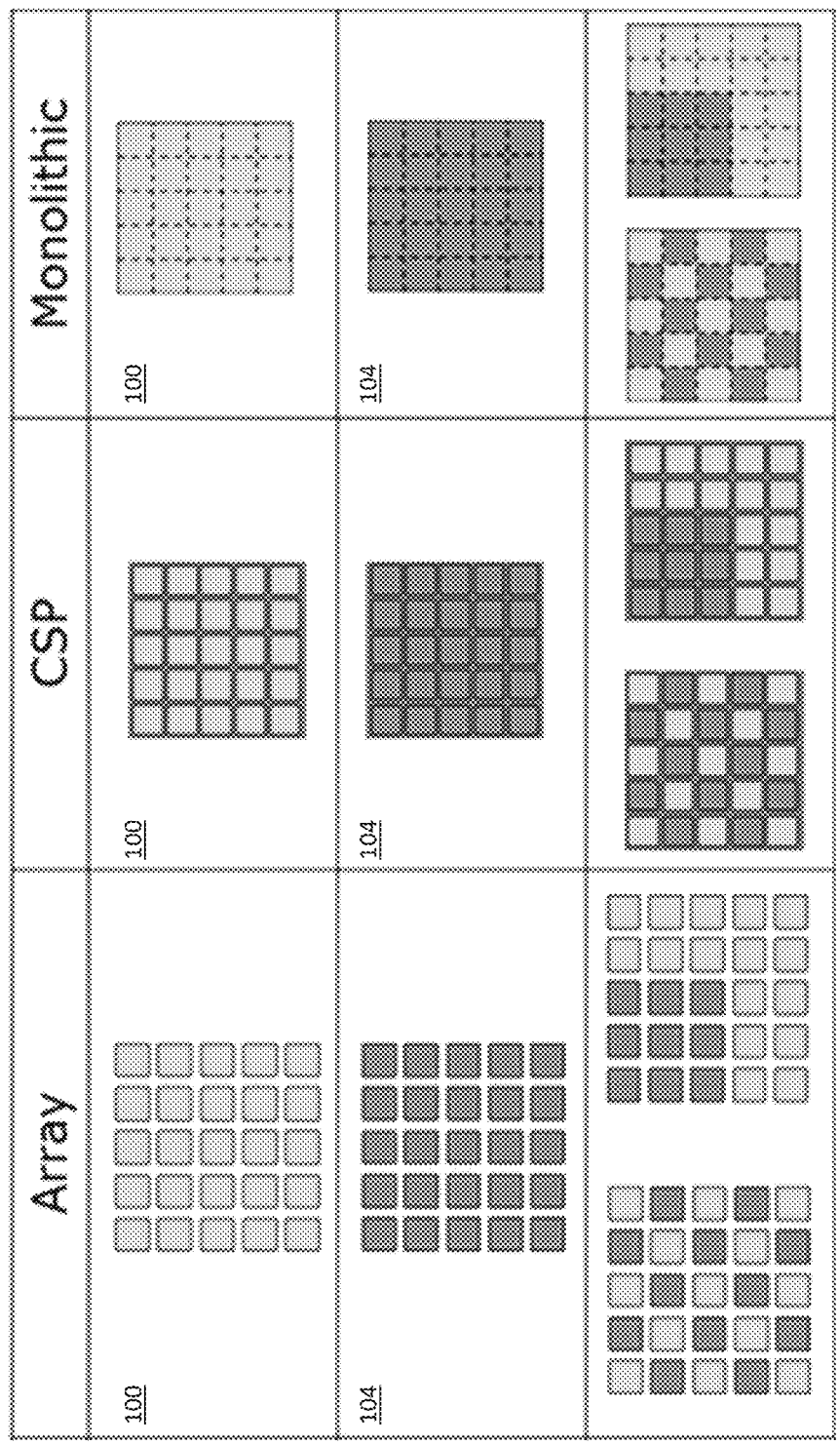

FIG. 15 illustrates various implementation embodiments for the pixelated light source 100 and the photosensor 104, The top row indicates the type of light source and photosensor physical configuration, the second row corresponds to the pixelated light source 100, the third row corresponds to the photosensor 104, and the fourth row illustrates the same exemplary pixel patterns implemented by the controller 110 for the different pixelated light source and photosensor physical configurations.

The pixelated light source 100 may be implemented as an array of discrete LEDs with a LED driver chip or a plurality of LED driver chips as shown in the first column. The pixelated light source 100 instead may be implemented as a plurality of LEDs assembled in a chip scalable package (CSP) with a LED driver chip or a plurality of LED driver chips as shown in the second column. Another option is to implement the pixelated light source 100 as a monolithic hybrid chip (LED plus driver IC) with individually controllable LED pixels as shown in the third column.

The photosensor 104 may be implemented as an array of discrete sensors as shown in the first column, as a plurality of sensors assembled in a chip scalable package (CSP) as shown in the second column, or as a monolithic hybrid chip (sensor+control IC) with individually addressable sensor pixels as shown in the third column.

The photosensor 104 and the pixelated light source 100 may be the same device. For example, the device may include a mixed array of discrete LEDs and discrete sensors with a LED driver chip (die) and a sensor control chip (die) or a multitude of LED driver chips and sensor control chips. In another example, the device may include a plurality of sensors assembled in a chip scalable package (CSP) with a LED driver chip and sensor control chip or a multitude of LED driver chips and sensor control chips. In another example, the device may include a monolithic hybrid chip (LED+driver IC) with individually controllable pixels, where the pixels may be operated in either light emission mode or in light sensing mode. The photosensor and pixelated light source embodiments described herein are not limited to visible light LED and/or photo elements. Elements emitting/sensing IR or UV wavelength or multiple wavelengths may also be used.

The algorithms for controlling the pixelated light source 100 and for analysing the photosensor data may be implemented in software, firmware and/or coded in hardware. The algorithms may be located in a computing/control unit such as a microcontroller device with peripherals, may be integrated into an LED driver chip or sensor control chip, etc.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:
1. An electronic system, comprising:
   a pixelated light source comprising a plurality of individually controllable pixels;
   a controller operable to control the pixelated light source;
   a photosensor configured to detect light signals emitted from the pixelated light source;

an analysis unit configured to recognize objects with different properties that pass in range of the pixelated light source and the photosensor, based on the light signals detected by the photosensor; and
a mirror aligned with the pixelated light source,
wherein the photosensor is realized by a subset of the individually controllable pixels of the pixelated light source,
wherein the subset of individually controllable pixels used to implement the photosensor is configured to detect light reflections from the mirror.

2. The electronic system of claim 1, wherein the analysis unit is configured to recognize objects with at least one of different sizes, shapes, surface reflectivity, transmissivity, density, homogeneity and velocity, based on the light signals detected by the photosensor.

3. The electronic system of claim 1, wherein the photosensor is integrated with the pixelated light source in a same semiconductor die or in a same package.

4. The electronic system of claim 1, wherein the controller is operable to configure a first subset of the individually controllable pixels as light sources and configure a second subset of the individually controllable pixels as the photosensor.

5. The electronic system of claim 1, wherein the controller is configured to change the subset of individually controllable pixels used to implement the photosensor so that the pixels used for light emission and the pixels used for light detection change over time.

6. The electronic system of claim 1, wherein each pixel of the pixelated light source is operated alternately in light emission mode and light detection mode.

7. The electronic system of claim 1, wherein the analysis unit is configured to modify one or more physical characteristics of an object in range of the pixelated light source and the photosensor, by forcing the controller to change at least one of intensity, wavelength or pattern of the light signals emitted by the pixelated light source in a direction of the object.

8. The electronic system of claim 1, wherein the analysis unit is configured to identify and track movement of an object that passes in range of the pixelated light source and the photosensor, based on the light signals detected by the photosensor, wherein a first signal at a first one of the individually controllable pixels indicates a position of an object, and wherein a second signal from a second one of the individually controllable pixels changes over time to identify and track movement of the object.

9. The electronic system of claim 8, wherein the analysis unit is configured to detect when the object reaches a predetermined position, based on the light signals detected by the photosensor.

10. The electronic system of claim 9, wherein the analysis unit is configured to detect when the object reaches the predetermined position by extrapolating from changes in the light signals detected by the photosensor over time, or by detecting a position of the object and comparing the detected position with a target stop position.

11. The electronic system of claim 1, wherein the analysis unit is configured to identify and track movement of the object based on the light signals detected by the subset of individually controllable pixels used to implement the photosensor.

12. The electronic system of claim 11, wherein each pixel of the pixelated light source is operated alternately in light emission mode and light detection mode.

13. The electronic system of claim 1, wherein the analysis unit is configured to determine a starting position of an object based on the light signals detected by the photosensor, and wherein the controller is configured to illuminate different subsets of pixels of the pixelated light source to track movement of the object after the starting position of the object is determined.

14. The electronic system of claim 1, wherein the controller is configured to illuminate an object using different light patterns emitted by the pixelated light source, and wherein the analysis unit is configured to recognize one or more surface properties of the object based on the light signals detected by the photosensor for the different light patterns emitted by the pixelated light source.

15. A method, comprising:
emitting light from a pixelated light source which comprises a plurality of individually controllable pixels;
detecting light signals emitted from the pixelated light source via a photosensor;
recognizing objects with different properties that pass in range of the pixelated light source and the photosensor, based on the light signals detected by the photosensor; and
modifying one or more physical characteristics of an object in range of the pixelated light source and the photosensor, by changing at least one of intensity, wavelength or pattern of the light signals emitted by the pixelated light source in a direction of the object.

16. The method of claim 15, further comprising:
configuring a first subset of the individually controllable pixels as light sources; and
configuring a second subset of the individually controllable pixels as the photosensor.

17. The method of claim 15, further comprising:
identifying and tracking movement of an object that passes in range of the pixelated light source and the photosensor, based on the light signals detected by the photosensor, wherein a first signal at a first one of the individually controllable pixels indicates a position of an object, and wherein a second signal from a second one of the individually controllable pixels changes over time to identify and track movement of the object.

18. The method of claim 15, further comprising:
determining a starting position of an object based on the light signals detected by the photosensor; and
illuminating different subsets of pixels of the pixelated light source to track movement of the object after the starting position of the object is determined.

19. The method of claim 15, further comprising:
illuminating an object using different light patterns emitted by the pixelated light source; and
recognizing one or more surface properties of the object based on the light signals detected by the photosensor for the different light patterns emitted by the pixelated light source.

20. An electronic system, comprising:
a pixelated light source comprising a plurality of individually controllable pixels;
a controller operable to control the pixelated light source;
a photosensor configured to detect light signals emitted from the pixelated light source;
an analysis unit configured to recognize objects with different properties that pass in range of the pixelated light source and the photosensor, based on the light signals detected by the photosensor;
a first polarization foil arranged in close proximity to the pixelated light source; and a second polarization foil arranged in close proximity to the photosensor, wherein the light signals emitted by the pixelated light source and detected by the photosensor pass through the first and the second polarization foils, wherein the analysis unit is configured to generate a two-dimensional image based on the light signals detected by the photosensor.

21. An electronic system, comprising:

a pixelated light source comprising a plurality of individually controllable pixels;

a controller operable to control the pixelated light source;

a photosensor configured to detect light signals emitted from the pixelated light source; and an analysis unit configured to:
  recognize objects with different properties that pass in range of the pixelated light source and the photosensor, based on the light signals detected by the photosensor; and
  determine a starting position of an object based on the light signals detected by the photosensor, wherein the controller is operable to illuminate different subsets of pixels of the pixelated light source to track movement of the object after the starting position of the object is determined.

* * * * *